United States Patent
Mullally

(10) Patent No.: US 10,015,682 B2
(45) Date of Patent: Jul. 3, 2018

(54) METHOD AND APPARATUS FOR REDUCING CELL IDENTIFIER CONFLICTS WHEN DEPLOYING A NEW CELL INTO A TELECOMMUNICATIONS NETWORK

(71) Applicant: Telefonaktiebolaget L M Ericsson (publ), Stockholm (SE)

(72) Inventor: Cormac Mullally, Athlone (IE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 240 days.

(21) Appl. No.: 14/904,719

(22) PCT Filed: Jul. 15, 2013

(86) PCT No.: PCT/EP2013/064924
§ 371 (c)(1),
(2) Date: Jan. 13, 2016

(87) PCT Pub. No.: WO2015/007301
PCT Pub. Date: Jan. 22, 2015

(65) Prior Publication Data
US 2016/0174082 A1    Jun. 16, 2016

(51) Int. Cl.
*H04W 24/02* (2009.01)
*H04W 16/18* (2009.01)

(52) U.S. Cl.
CPC ........... *H04W 24/02* (2013.01); *H04W 16/18* (2013.01)

(58) Field of Classification Search
CPC ..... H04W 24/02; H04W 84/045; H04W 8/26; H04W 16/08; H04W 16/12; H04W 36/0083; H04L 61/2046; H04L 61/2092; H04L 61/6022; H04L 29/12264
See application file for complete search history.

(56) References Cited

U.S. PATENT DOCUMENTS

| 4,374,437 A * | 2/1983 | Citta ......................... H03J 7/26 348/732 |
| 6,285,874 B1 * | 9/2001 | Magnusson ........... H04W 16/00 455/456.1 |
| 8,831,605 B2 * | 9/2014 | Kolding ................ H04W 24/02 370/328 |

(Continued)

FOREIGN PATENT DOCUMENTS

WO    2011050859 A1    5/2011

OTHER PUBLICATIONS

PCT International Search Report, dated Apr. 15, 2014, in connection with International Application No. PCT/EP2013/064924, all pages.

(Continued)

*Primary Examiner* — Matthew C Sams
(74) *Attorney, Agent, or Firm* — Sage Patent Group

(57) ABSTRACT

The telecommunications network, which includes a plurality of existing cells each having an assigned identifier from a set of identifiers, calculates a value for each existing cell, wherein the value represents the likelihood of an identifier conflict if a new cell is deployed near that existing cell. The value may therefore provide a network operator with an indication of the likelihood of an identifier conflict if a new cell is deployed in a particular area, such that the network operator may proactively avoid identifier conflicts.

16 Claims, 14 Drawing Sheets

(56) References Cited

U.S. PATENT DOCUMENTS

| | | | | |
|---|---|---|---|---|
| 9,433,016 B2* | 8/2016 | Yang | ................ | H04W 74/0816 |
| 2009/0023464 A1* | 1/2009 | Prakash | ................ | H04L 5/0001 |
| | | | | 455/501 |
| 2009/0129291 A1* | 5/2009 | Gupta | .................... | H04W 8/26 |
| | | | | 370/254 |
| 2010/0008235 A1* | 1/2010 | Tinnakornsrisuphap | | |
| | | | ....................... | H04L 29/12264 |
| | | | | 370/241 |
| 2011/0128890 A1* | 6/2011 | Schein | .................... | H04L 41/12 |
| | | | | 370/255 |
| 2012/0163238 A1* | 6/2012 | Gunnarsson | .......... | H04W 16/08 |
| | | | | 370/254 |
| 2012/0252459 A1* | 10/2012 | Yu | .................... | H04W 36/0083 |
| | | | | 455/436 |
| 2012/0276899 A1* | 11/2012 | Kolding | ............... | H04W 24/02 |
| | | | | 455/435.1 |
| 2013/0006453 A1* | 1/2013 | Wang | ............... | B60W 50/0205 |
| | | | | 701/22 |
| 2014/0073304 A1* | 3/2014 | Brisebois | .............. | H04W 24/02 |
| | | | | 455/418 |
| 2014/0329528 A1* | 11/2014 | Zhao | .................... | H04W 36/30 |
| | | | | 455/436 |
| 2014/0376519 A1* | 12/2014 | Yang | ................ | H04W 74/0816 |
| | | | | 370/336 |
| 2015/0319723 A1* | 11/2015 | Korhonen | .......... | H04W 56/001 |
| | | | | 370/350 |

OTHER PUBLICATIONS

Muhammad Basit Shahab et al., Neural networks based Physical Cell Identity assignment for self organized 3GPP Long Term Evolution, Telecommunications and Signal Processing (TSP), 2012 35th International Conference On, IEEE, Jul. 3, 2012, pp. 173-177.
A* search algorithm, from Wikipedia, the free encyclopedia, pp. 1-9, retrieved Dec. 16, 2015.

* cited by examiner

METHOD AND APPARATUS FOR REDUCING CELL IDENTIFIER CONFLICTS WHEN DEPLOYING A NEW CELL INTO A TELECOMMUNICATIONS NETWORK

TECHNICAL FIELD

This invention relates to a method and apparatus for deploying a new cell into a telecommunications network.

BACKGROUND

Telecommunications networks using a cellular system include a plurality of cells each covering a particular area of land. Network operators for the telecommunications network assign an identifier (such as a physical cell identifier or scrambling code) and frequency to each cell and its corresponding base station. In conventional telecommunications networks, network operators performed the identity assignment manually with the aim of maximising key performance indicators (KPIs) such as mobility success rate.

Wireless telecommunications networks are continuously being developed to give increased coverage, improve capacity and improve KPIs. However, the identifier assignment must be performed each time the wireless telecommunications network changes. This places a large burden on the network operator such that manual identifier assignment becomes unreasonable. Accordingly, a Self Organizing Network (SON), such as Automatic Neighbour Relation or Physical Cell Identifier assignment was developed which introduced automatic relation management and automatic identifier assignment respectively.

Although the SON frees the network operator from the task of manual identifier assignment, it presents new problems. The automatic identifier assignment sometimes produces identifier conflicts between cells of the telecommunications network. This results in dropped calls and poor KPIs. Such conflicts are reported to the network operator, who then has to resolve the problem.

It is therefore desirable to alleviate some or all of the above problems.

SUMMARY

According to a first aspect of the invention, there is provided a method of deploying a new cell into a telecommunications network, the telecommunications network including a plurality of existing cells wherein each existing cell is assigned one of a set of identifiers, the method comprising the steps of: identify a plurality of existing cells in the telecommunications network and a corresponding identifier for each existing cell of the plurality of existing cells; and calculate a value for each existing cell, wherein the value represents the likelihood of an identifier conflict if a new cell is deployed near that existing cell.

The present invention therefore provides the network operator with a value representing the likelihood of an identifier conflict if a new cell is deployed near an existing cell. The value may therefore inform the network operator how problematic it would be to deploy a new cell in a particular area of the telecommunications network or how a particular cell of the telecommunications network will react to the addition of new cells in its area.

The network operator may then judge how the automatic identifier assignment will perform in the future, such that the operator may pre-empt and forestall any identifier conflicts in the telecommunications network (therefore preventing any dropped calls or poor KPIs that may have resulted from the problem), rather than simply reacting to a problem once it has already occurred.

The step of calculating the value for the existing cell may include the step of determining if the existing cell passes a predetermined rule for each possible identifier assignment for the existing cell. The network operator may therefore run a rules based algorithm to calculate the value. The predetermined rule may determine if the existing cell has an identifier conflict with another existing cell (such as a neighbouring cell, a neighbour's neighbouring cell, or another cell within a certain distance) for each possible identifier assignment for the existing cell.

The value may thus represent a cumulative total of identifier assignments that pass the predetermined rule. A high value for a particular existing cell will therefore inform the network operator that there is a reduced likelihood of an identifier conflict if a new cell is deployed near that existing cell and vice versa.

The value may have a first part and a second part, wherein the first part represents a cumulative total of identifier assignments that pass the predetermined rule, and the second part represents a cumulative total of identifier assignments that pass the predetermined rule with a cost (wherein the cost may represent an increased likelihood of an identifier conflict if the new cell is deployed near that existing cell). The algorithm may therefore be a rules cost based algorithm, such that the network operator may be informed that an existing cell passes a predetermined rule for a first set of possible identifier assignments and passes the predetermined rule for a second set of possible identifier assignments with a cost.

Furthermore, the step of calculating the value for the existing cell may include the step of determining if the existing cell passes a plurality of predetermined rules for each possible identifier assignment for the existing cell. Some of the plurality of predetermined rules may be mandatory (such that a value only represents whether the existing cell passes the predetermined rule for one or more possible identifier assignments) or optional (such that a value has a first part representing whether the existing cell passes the predetermined rule for one or more possible identifier assignments, and a second part representing whether the existing cell passes the predetermined rule for one or more possible identifier assignments with a cost). The optional rules may be given an associated cost at configuration.

The method may further comprise the step of determining if the existing cell passes the predetermined rule for each possible identifier assignment if the existing cell changes to another identifier of the set of identifiers. This may be performed for each existing cell that does not pass the predetermined rule for each possible identifier assignment for that existing cell. The network operator may therefore adopt an A* search algorithm to determine a Least Impacted Path to be informed of the number of identifier changes that must occur in the telecommunications network for a new cell to be deployed near an existing cell without an identifier conflict.

The step of determining if the existing cell passes the predetermined rule for each possible identifier assignment if the existing cell changes to another identifier of the set of identifiers may include the steps of identifying a subset of existing cells with which the existing cell has an identifier conflict with for each possible identifier assignment for the existing cell; and for each existing cell of the subset of existing cells, determine if the existing cell of the subset of existing cells has an identifier conflict for each possible identifier assignment for the existing cell of the subset of existing cells. Accordingly, if each existing cell of the subset of existing cells does not have an identifier conflict for each possible identifier assignment for the existing cell of the subset of existing cells, it is determined that the existing cell passes the predetermined rule for each possible identifier assignment if the existing cell changes to another identifier of the set of identifiers. The network operator may then be informed accordingly, and the corresponding identifier assignment changes may be recorded and actioned if necessary.

If the existing cell of the subset of existing cells has an identifier conflict with an existing cell of a new subset of existing cells, the method may further comprise the steps of: identifying each existing cell in the new subset of existing cells; and for each existing cell of the new subset of existing cells, determining if the existing cell of the new subset of existing cells has an identifier conflict for each possible identifier assignment for the existing cell of the new subset of existing cells. If the existing cell of the new subset of existing cells has an identifier conflict with an existing cell of a subsequent subset of existing cells, the steps of identifying each existing cell in the subsequent subset of existing cells and determining if each existing cell of the subsequent subset of existing cells has an identifier conflict for each possible identifier assignment may be performed in an iterative manner until it is determined that an existing cell of the subsequent subset of existing cells does not have an identifier conflict for each possible identifier assignment for the existing cell of the subsequent subset of existing cells. Accordingly, the algorithm may result in a solution for an existing cell informing the network operator if the existing cell passes the predetermined rule for each possible identifier assignment if one or more existing cells change to another identifier assignment of the set of identifiers, how many existing cells must change to another identifier assignment of the set of identifiers for it to pass the predetermined rule, and what other identifier assignment of the set of identifiers each existing cell must change to.

The value may therefore also include a third part, wherein the third part represents a cumulative total of other existing cells that may change to another identifier of the set of identifiers for the existing cell to pass the predetermined rule for each possible identifier assignment.

The method may further comprise the step of deploying a new cell into the telecommunications network based on the values for each existing cell.

The telecommunications network may be a wireless telecommunications network and may support Self Organizing Network features. The identifier may be a Physical Cell Identifier or a Scrambling Code.

A network element for deploying a new cell into a telecommunications network may comprise a processor and a memory, said memory containing instructions executable by said processor whereby said network element may be operative to perform the steps of the method of the first aspect of the invention.

A computer program product comprising computer executable code which when performed on a computer may cause the computer to control a node to perform the method of the first aspect of the invention.

According to a second aspect of the invention, there is provided a telecommunications network having a plurality of existing cells, wherein each existing cell of the plurality of existing cells has an assigned identifier from a set of identifiers, the telecommunications network comprising a processor configured to calculate a value for each existing cell, wherein the value represents the likelihood of an identifier conflict if a new cell is deployed near that existing cell.

BRIEF DESCRIPTION OF THE DRAWINGS

Embodiments of the invention will now be described, by way of example, and with reference to the drawings in which.

DETAILED DESCRIPTION

Figure 1:
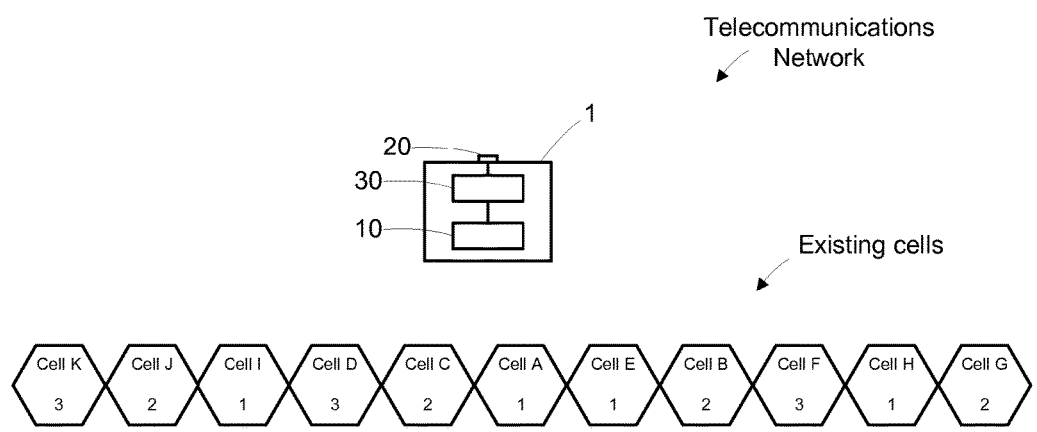
FIG. 1 is a schematic diagram of an embodiment of a telecommunications network of the present invention, including a network element and a plurality of existing cells.

A first embodiment of a telecommunications network of the present invention will now be described with reference to FIG. 1. The telecommunications network is an LTE network and includes a network element 1 and a plurality of existing cells. In this embodiment, the plurality of existing cells are a series of cells each corresponding to a land area covered by a base station for that cell. Each cell is assigned one of a set of identifiers and the base station transmits at a particular frequency (or set of frequencies). As shown in FIG. 1, the plurality of cells include Cell A to Cell K, and the set of identifiers include identifiers one to three (e.g. PCI 1, PCI 2 and PCI 3).

The network element 1 includes a processor 10, a memory 30 and a communications interface 20. The communications interface 20 is configured to communicate with each base station of each existing cell of the plurality of existing cells. In this embodiment, the communications interface 20 is configured to receive data relating to the identity and location of each existing cell, and is also configured to send a configuration signal to one or more of the existing cells to cause the cell to change to another identifier of the set of identifiers.

Figure 2:
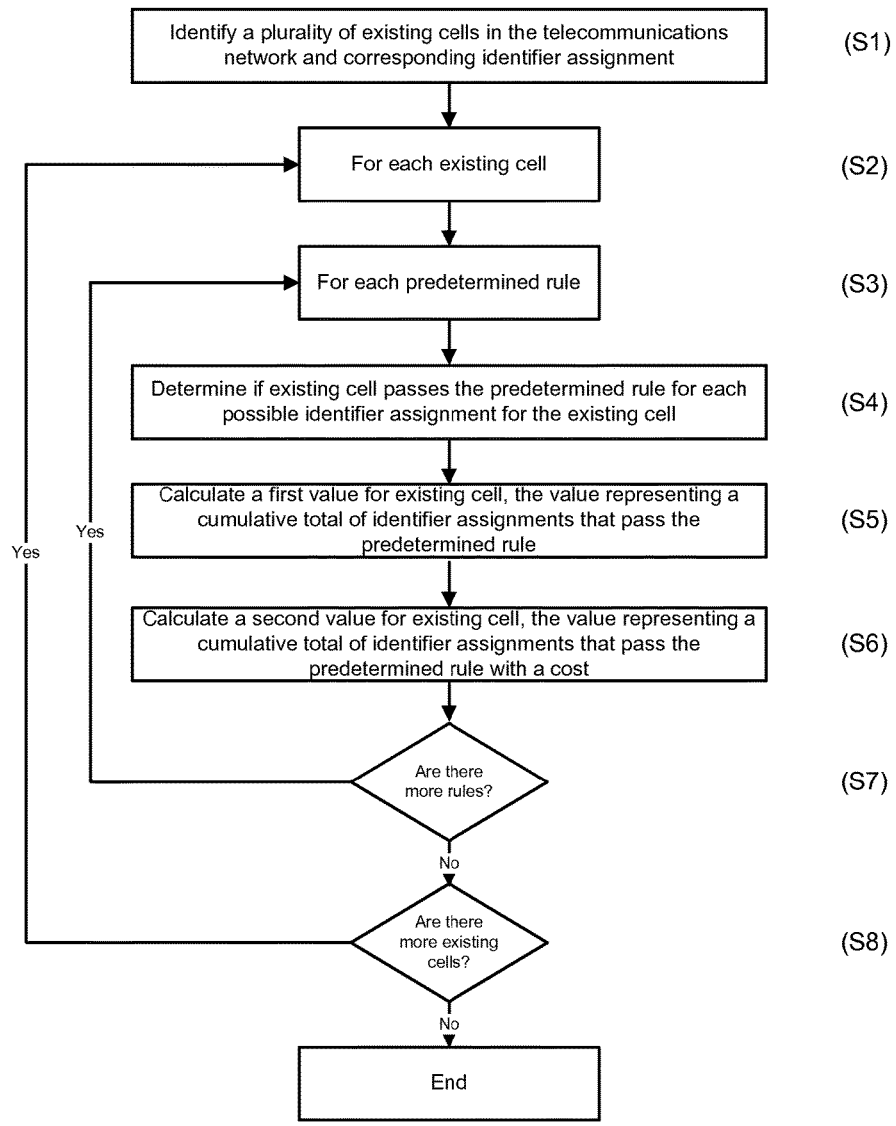
FIG. 2 is a flow diagram illustrating a first embodiment of a method of the present invention.

In this embodiment, a network operator controls the network element 1. The network element 1 includes functionality to automatically assign identifiers to each existing cell. The network element 1 is also configured to calculate a value for each existing cell, wherein the value represents a likelihood of an identifier conflict if a new cell is deployed near the existing cell. Accordingly, the network element 1 receives data relating to the identify and location of each existing cell, which may be stored in the memory 30, and the processor 10 is configured to perform the method of the present invention to calculate the values for each existing cell. An embodiment of the method of the present invention will now be described with reference to FIG. 2.

As a first step, the network element 1 identifies a plurality of existing cells in the telecommunications network and corresponding identifier assignment (step S1). The network element 1 also determines the position of each existing cell of the plurality of existing cells, which may be the GPS location of each base station for each existing cell.

The processor 10 is configured to run an algorithm to calculate a value for each existing cell. In this embodiment, the algorithm includes a plurality of rules including:
1. Does a neighbouring cell of the existing cell have the same identifier assignment and the same frequency;
2. Does a neighbour's neighbouring cell of the existing cell have the same identifier assignment and the same frequency; and
3. Does another cell within a certain distance of the existing cell have the same identifier assignment and the same frequency.

The processor 10 is configured to determine, for each existing cell and for each rule (step S2 and S3), if the existing cell passes the rule for each possible identifier assignment for the existing cell (step S4). In this embodiment, rule 1 is mandatory (i.e. the existing cell must pass the rule for at least one identifier assignment), and rules 2 and 3 have an associated cost (i.e. the existing cell may pass the rule but with an associated cost). Accordingly, the processor 10 removes any possible identifier assignment for an existing cell that does not pass a mandatory rule from a list of possible identifier assignments, and adds a cost to an identifier assignment for an existing cell that passes the mandatory rules but with an associated cost.

The processor 10 therefore returns a value for each existing cell having a first part and a second part (steps S5 and S6). The first part represents the cumulative total of possible identifier assignments for that existing cell which pass all the rules (i.e. the number of possible identifier assignments that were not removed from the list of possible identifier assignments). The second part represents the cumulative total of possible identifier assignments for that existing cell which pass all the mandatory rules but with an associated cost. In steps S7 and S8, the processor determines whether there are more rules or existing cells, and loops back to step S2 and S3 respectively if there are further rules or existing cells for the algorithm.

The network operator may then be informed of each value for each existing cell in a table, as shown in the following example:

| Cell | Number of Possible Identifier Assignments that pass all mandatory and optional rules | Number of Possible Identifier Assignments that pass all mandatory rules but not the optional rules (i.e. a cost is assigned) |
|---|---|---|
| Cell A | 2 | 3 |
| Cell B | 1 | 2 |
| Cell C | 0 | 1 |
| Cell D | 0 | 0 |

The network operator is therefore informed that a new cell may be deployed near:
Cell A—no issues (i.e. no or very low possibility of an identifier conflict);
Cell B—small likelihood of an identifier conflict (due to the low number of possible identifier assignments that pass all mandatory rules), but identifier assignments with an acceptable cost are possible;
Cell C—increased likelihood of an identifier conflict, identifier assignments with an acceptable cost are possible; and
Cell D—identifier conflicts for all possible identifier assignments.

The algorithm therefore provides the network operator with an indication of the likelihood of an identifier conflict if a new cell is deployed near any one of the existing cells. The network operator may therefore make deployment decisions based on the value, may configure the network's automatic identifier assignment application to take into account the value, may give the application more identifiers to assign to the cells, may look for incorrectly added neighbouring cells, or may configure the network's automatic identifier assignment application to take into account the value. This proactive approach forestalls any future identifier conflicts, which would otherwise result in poor KPIs.

Figure 3:
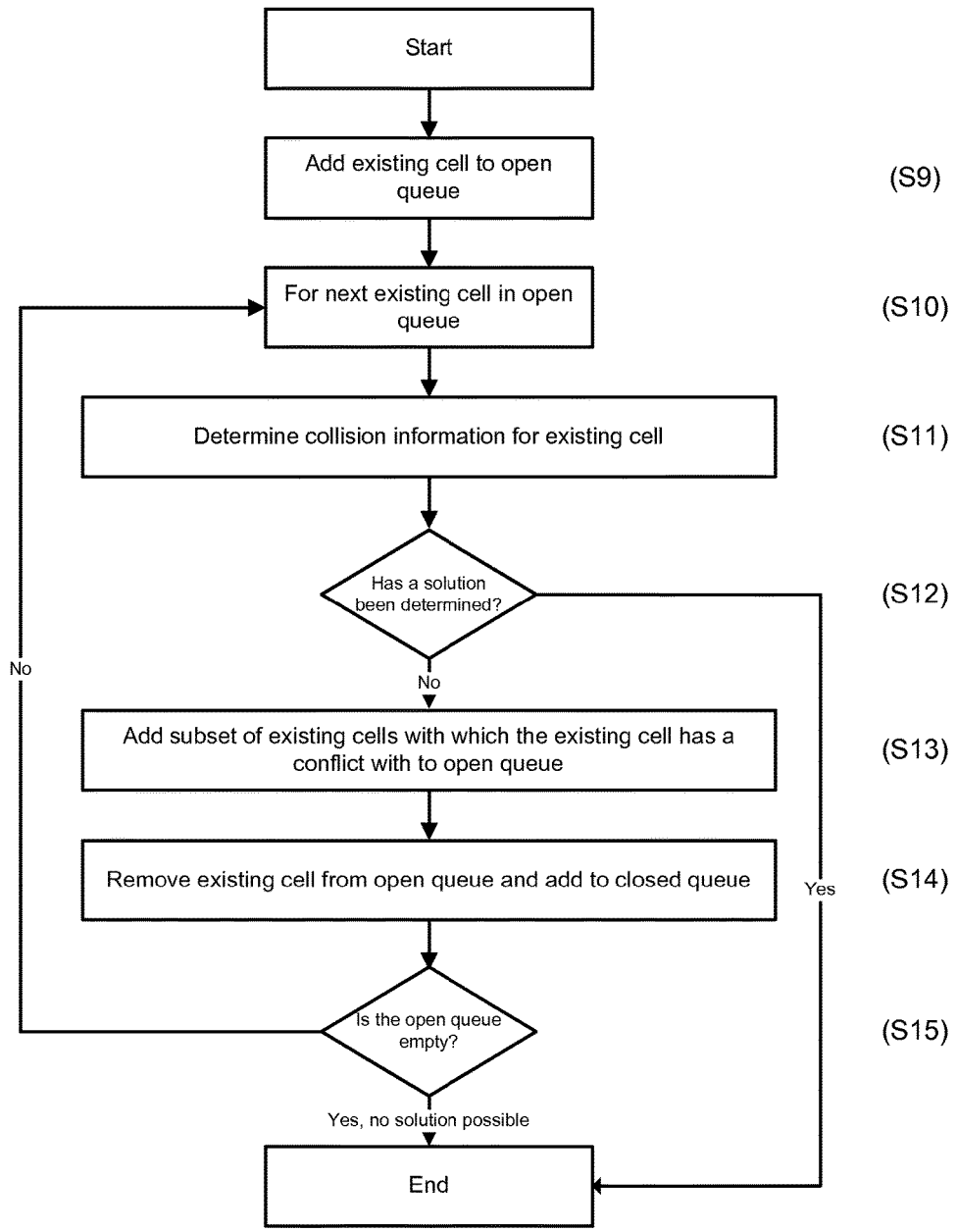
FIG. 3 is a flow diagram illustrating a further algorithm of the method of FIG. 2.

A further algorithm for the method of the present invention will now be described with reference to FIGS. 3 and 4. The rules cost based algorithm described above is expanded to include an A* search algorithm, which identifies a path of identifier changes for one or more existing cells. Thus, for an existing cell that doesn't pass the rules for each possible identifier assignment (e.g. Cell D in the example above), a path of identifier changes for one or more other existing cells may be identified such that the existing cell does pass each rule. This is known as the Least Impacted Path. This process will now be described in more detail in FIGS. 3 and 4.

In this embodiment, the algorithm is performed for each existing cell that needs an A* search (i.e. each existing cell that doesn't pass a predetermined rule for each possible identifier assignment for that existing cell). As a first step, the existing cell is added to an 'open queue' (step S9). The open queue is an ordered queue of existing cells that are to be evaluated by the A* search algorithm. The algorithm is performed in a loop for the next cell in the open queue (step S10). At this stage, the only existing cell in the open queue is the existing cell.

In the next step, the collision information for the existing cell is determined (step S11). The algorithm therefore either returns a subset of other existing cells that the existing cell has an identifier conflict with (and the corresponding identifier assignment for the conflict), or determines that a solution has been found (i.e. there are no identifier conflicts for any of the possible identifier assignments) in step S12. In this embodiment, step S12 returns a subset of existing cells with which the existing cell has an identifier conflict with. As shown in FIG. 3, the subset of existing cells are added to the open queue in step S13, and the existing cell is removed from the open queue and added to a closed queue (a queue of cells that have already been evaluated) in step S14.

A graph may then be constructed illustrating the existing cell, each existing cell of the subset of existing cells with which the existing cell has an identifier conflict with and each corresponding identifier (the construction of the graph is described in more detail below).

In step S15, the algorithm determines if the open queue is empty. As the open queue is not empty, the algorithm loops back to step S10 and the steps are repeated for the next existing cell in the open queue. The skilled person will understand that if the open queue was empty, then the algorithm cannot find a solution for that existing cell.

Figure 4:
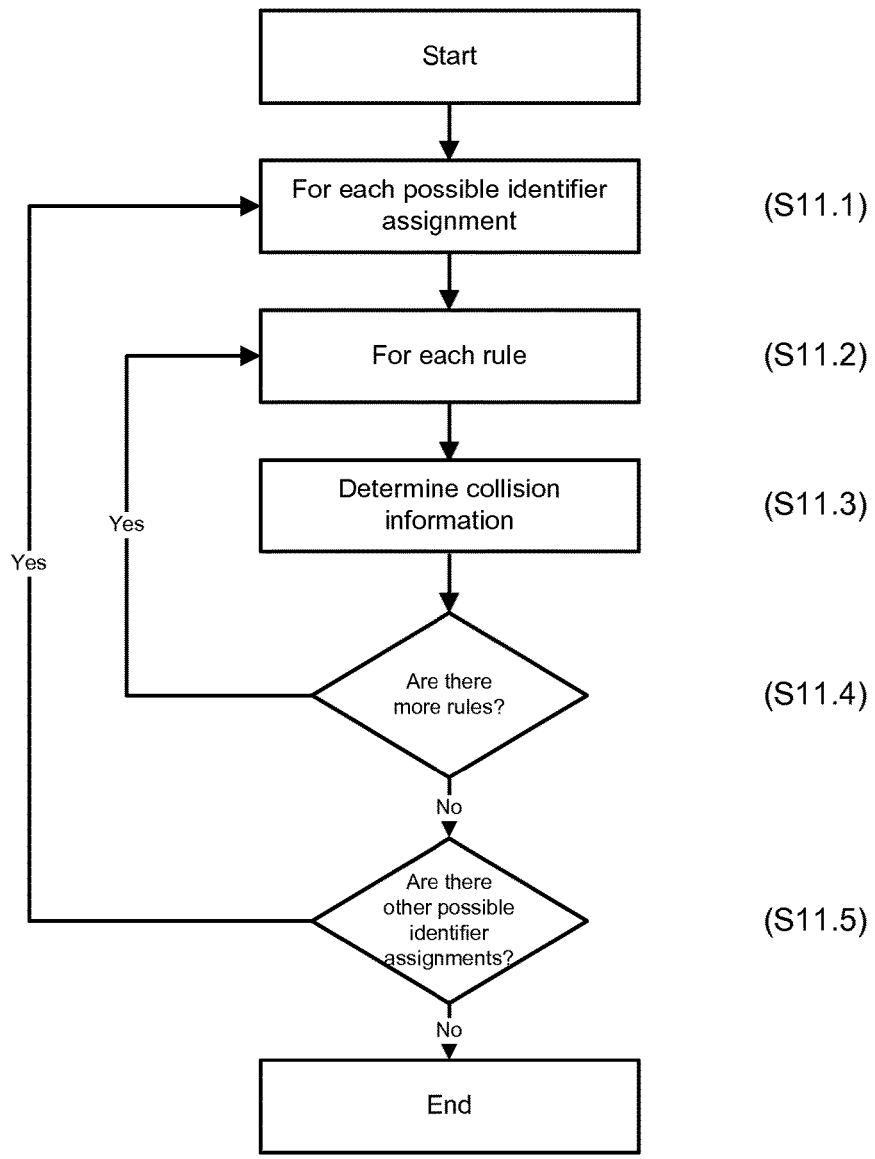
FIG. 4 is a flow diagram illustrating further steps of the algorithm of FIG. 3, and FIGS. 5a to 5l illustrate an example of the algorithm of FIGS. 3 and 4.

FIG. 4 illustrates step S11 in more detail. For each possible identifier assignment for the existing cell and for each rule (steps S11.1 and S11.2), the collision information is determined (step S11.3). The algorithm determines if there are more rules or other possible identifier assignments in steps 11.4 and 11.5, and if so, loops back to steps 11.1 and 11.2 respectively.

The algorithm therefore runs in an iterative manner—identifying a subsequent set of existing cells with which each new existing cell from the open queue has an identifier conflict with, determining if each existing cell of the subsequent set of existing cells has an identifier conflict for each possible identifier assignment, and adding the collision information to the graph—until it identifies an existing cell that does not have any identifier conflicts. Once this occurs, the process has found a solution identifying the one or more existing cells that must change identifier for an existing cell to pass the rule.

Figure 5A:
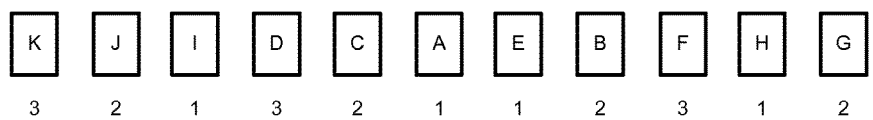

A detailed example of the A* algorithm will now be described with reference to FIGS. 5a to 5l. FIG. 5a illustrates a having a plurality of existing cells A to K and possible identifiers one to three.

In this example, the network operator defines two rules for the algorithm—does a neighbouring cell of the existing cell have the same identifier, and does a neighbour's neighbouring cell of the existing cell have the same identifier. The skilled person will recognize from the network of FIG. 5a that there is an identifier conflict between existing cell A and existing cell E (as they are neighbouring cells with the same identifier. In this example, a solution for existing cell A (i.e. a path of identifier changes for one or more other existing cells, such that existing cell A passes the rule(s)) will be determined.

Step 1

In step 1, the closed queue and the open queue are initially empty. Existing cell A is added to the open queue, and the collision information for existing cell A is calculated. The collision information is calculated for each possible identifier assignment for an existing cell, except for its current identifier assignment and any parent cells of the existing cell (explained below). For existing cell A, the collision information for possible identifier assignments 2 and 3 are determined. The collision information identifies existing cells C and B as clashing cells for identifier assignment 2 (as existing cell C is existing cell A's neighbour and has identifier assignment 2, and existing cell B is existing cell A's neighbour's neighbour and has identifier assignment 2), and existing cell D as a clashing cell for identifier assignment 3 (as existing cell D is cell A's neighbour and has identifier assignment 3).

Figure 5B:
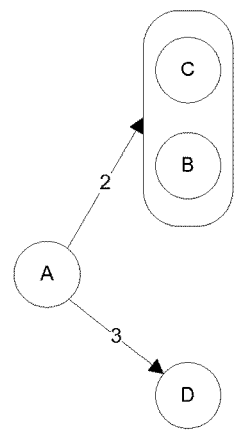

The process has not yet found a solution, as there are identifier conflicts between existing cell A and existing cells C, B and D. As shown in FIG. 5b, a graph is constructed to show the following information:
Existing cell C is a parent cell to existing cell A
Existing cell C's path is identifier 2
Existing cell C's distance from start cell (existing cell A)=1
Existing cell B is a parent cell to existing cell A
Existing cell B's path is identifier 2
Existing cell B's distance from start cell (existing cell A)=1
Existing cell D is a parent cell to existing cell A
Existing cell D's path is identifier 3
Existing cell D's distance from start cell (existing cell A)=1

Existing cells C, B and D are added to the open queue, and existing cell A is removed from the open queue and added to the closed queue. In this embodiment, the existing cells in the open queue are ordered according to the following heuristics:
  The lower the distance from the start cell (existing cell A), the higher the existing cell in the open queue; and
  The lower the number of clashing cells, the higher the existing cell in the open queue.
In this example, the open queue includes existing cells D, C and B in that order.

Step 2

Figure 5C:
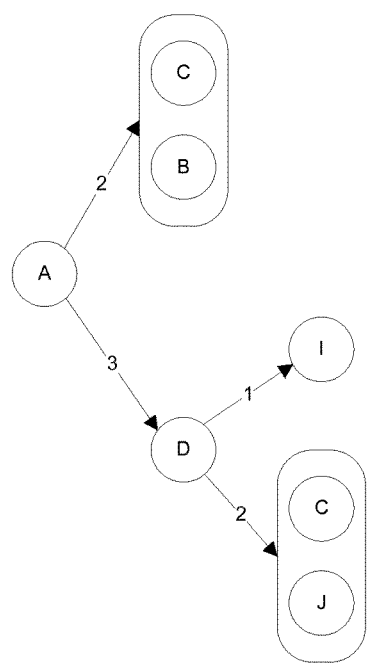

The next existing cell from the open queue (existing cell D) is now analysed. The collision information for existing cell D is calculated for each possible identifier assignment, which identifies existing cell I for identifier assignment 1 (existing cell A is not added, as it is the parent of existing cell D), and existing cells C and J for identifier assignment 2. Again, the process has not found a solution, as there are identifier conflicts between existing cell D and existing cells I, C and J. The following information is added to the graph (as shown in FIG. 5c):
Existing cell I is a parent cell to existing cell D
Existing cell I's path is identifier 1
Existing cell I's distance from start cell (existing cell A)=2
Existing cell C is a parent cell to existing cell D
Existing cell C's path is identifier 2
Existing cell C's distance from start cell (existing cell A)=2
Existing cell J is a parent cell to existing cell D
Existing cell J's path is identifier 2
Existing cell J's distance from start cell (existing cell A)=2

The subset of existing cells for existing cell D are added to the open queue if they are not already present in the open queue, existing cell D is removed from the open queue and added to the closed queue, and the open queue is ordered. The open queue now consists of existing cells C, B, I and J, in that order.

Step 3

Figure 5D:
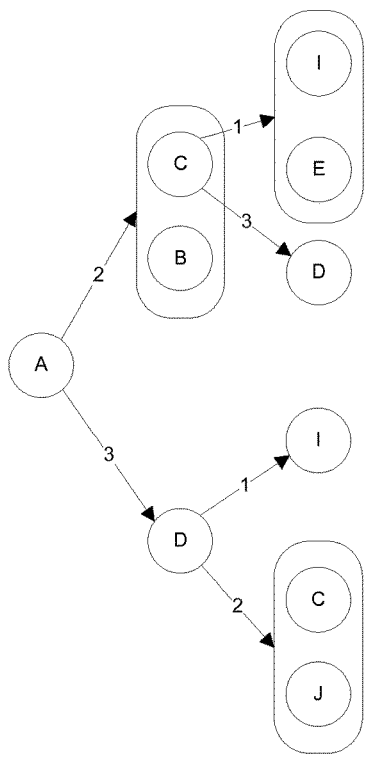

The next existing cell from the open queue (existing cell C) is now analysed. The collision information for existing cell C is calculated for each possible identifier assignment, which identifies existing cells I and E for identifier assignment 1 (existing cell A is not added, as it is the parent of existing cell C), and existing cell D for identifier assignment 3. Again, the process has not found a solution, as there are identifier conflicts between existing cell C and existing cells I, E and D. The following information is added to the graph (as shown in FIG. 5d):
Existing cell I is a parent cell to existing cell C
Existing cell I's path is identifier 1
Existing cell I's distance from start cell (existing cell A)=2
Existing cell E is a parent cell to existing cell C
Existing cell E's path is identifier 1
Existing cell E's distance from start cell (existing cell A)=2
Existing cell D is a parent cell to existing cell C
Existing cell D's path is identifier 3
Existing cell D's distance from start cell (existing cell A)=2

The subset of existing cells for existing cell C are added to the open queue, if they are not already present in the open queue, existing cell C is removed from the open queue and added to the closed queue, and the open queue is ordered. The open queue now consists of existing cells B, I, J and E in that order.

Step 4

Figure 5E:
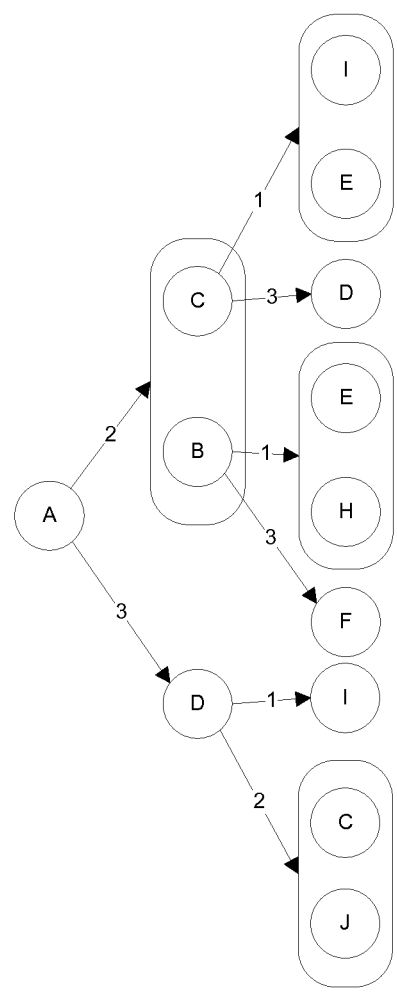

The next existing cell from the open queue (existing cell B) is now analysed. The collision information for existing cell B is calculated for each possible identifier assignment, which identifies existing cells E and H for identifier assignment 1 (existing cell A is not added, as it is the parent of existing cell B), and existing cell F for identifier assignment 3. Again, the process has not found a solution, as there are identifier conflicts between existing cell B and existing cells E, H and F. The following information is added to the graph (as shown in FIG. 5e):
Existing cell E is a parent cell to existing cell B
Existing cell E's path is identifier 1
Existing cell E's distance from start cell (existing cell A)=2
Existing cell H is a parent cell to existing cell B Existing cell H's path is identifier 1
Existing cell H's distance from start cell (existing cell A)=2
Existing cell F is a parent cell to existing cell B
Existing cell F's path is identifier 3
Existing cell F's distance from start cell (existing cell A)=2

The subset of existing cells for existing cell B are added to the open queue, if they are not already present in the open queue, existing cell B is removed from the open queue and added to the closed queue, and the open queue is ordered. The open queue now consists of existing cells F, I, J, H, and E in that order.

Step 5

Figure 5F:
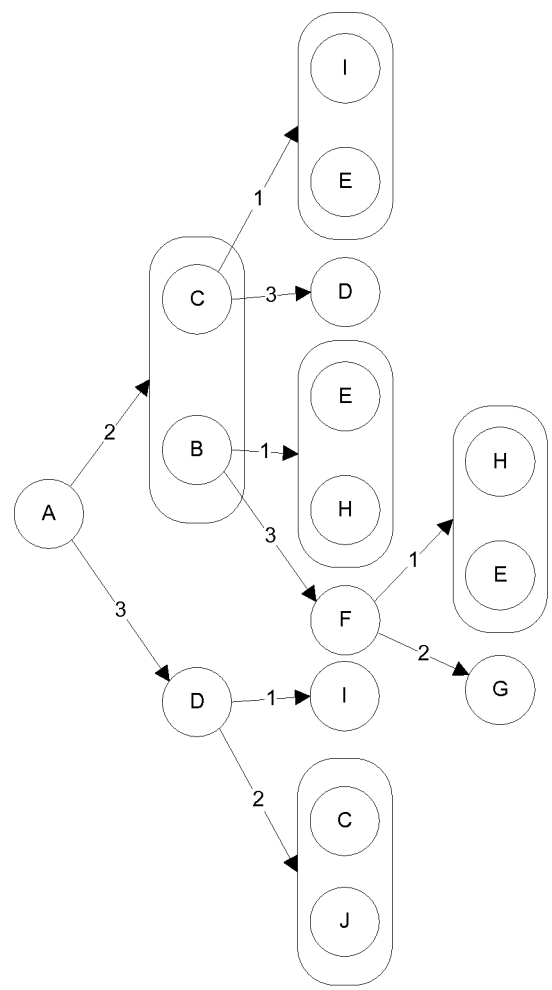

The next existing cell from the open queue (existing cell F) is now analysed. The collision information for existing cell F is calculated for each possible identifier assignment, which identifies existing cells H and E for identifier assignment 1, and existing cell G for identifier assignment 2 (existing cell B is not identified as existing cell B is a parent cell of existing cell F). Again, the process has not found a solution, as there are identifier conflicts between existing cell F and existing cells H, E and G. The following information is added to the graph (as shown in FIG. 5f):
Existing cell H is a parent cell to existing cell F
Existing cell H's path is identifier 1
Existing cell H's distance from start cell (existing cell A)=3
Existing cell E is a parent cell to existing cell F
Existing cell E's path is identifier 1
Existing cell E's distance from start cell (existing cell A)=3
Existing cell G is a parent cell to existing cell F
Existing cell G's path is identifier 2
Existing cell G's distance from start cell (existing cell A)=3

The subset of existing cells for existing cell F are added to the open queue, if they are not already present in the open queue, existing cell F is removed from the open queue and added to the closed queue, and the open queue is ordered. The open queue now consists of existing cells I, J, H, E and G in that order.

Step 6

Figure 5G:
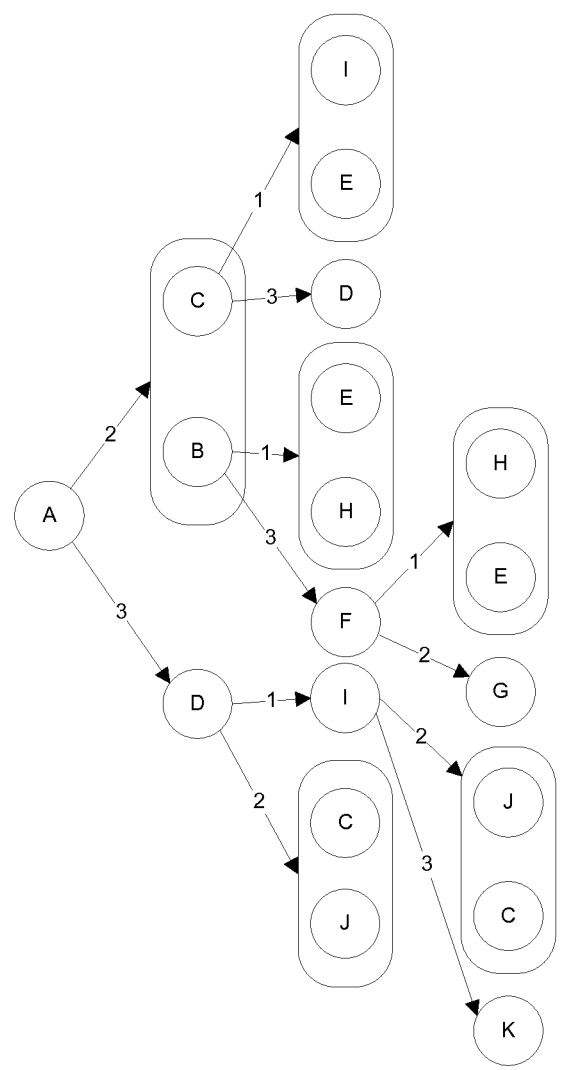

The next existing cell from the open queue (existing cell I) is now analysed. The collision information for existing cell I is calculated for each possible identifier assignment, which identifies existing cells J and C for identifier assignment 2, and existing cell K for identifier assignment 3 (existing cell D is not added, as it is the parent of existing cell I). Again, the process has not found a solution, as there are identifier conflicts between existing cell I and existing cells J, C and K. The following information is added to the graph (as shown in FIG. 5g):
Existing cell J is a parent cell to existing cell I
Existing cell J's path is identifier 2
Existing cell J's distance from start cell (existing cell A)=3
Existing cell C is a parent cell to existing cell I
Existing cell C's path is identifier 2
Existing cell C's distance from start cell (existing cell A)=3
Existing cell K is a parent cell to existing cell I
Existing cell K's path is identifier 3
Existing cell K's distance from start cell (existing cell A)=3

The subset of existing cells for existing cell I are added to the open queue, if they are not already present in the open queue, existing cell I is removed from the open queue and added to the closed queue, and the open queue is ordered. The open queue now consists of existing cells J, H, E, K and G in that order.

Step 7

Figure 5H:
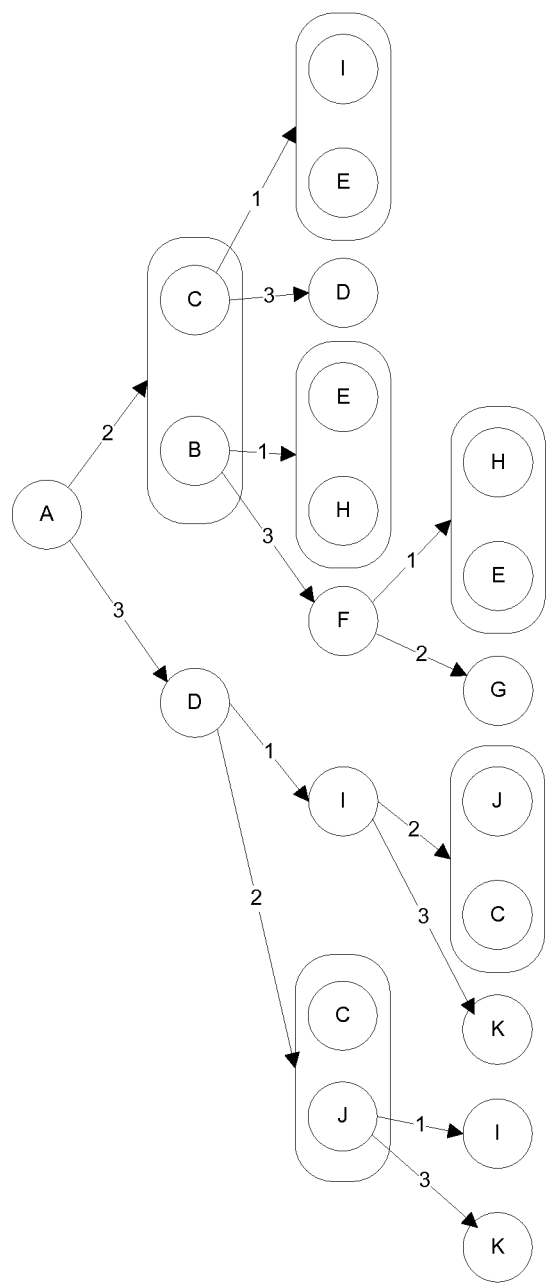

The next existing cell from the open queue (existing cell J) is now analysed. The collision information for existing cell J is calculated for each possible identifier assignment, which identifies existing cell I for identifier assignment 1, and existing cell K for identifier assignment 3 (existing cell D is not added, as it is the parent of existing cell J). Again, the process has not found a solution, as there are identifier conflicts between existing cell J and existing cells I and K. The following information is added to the graph (as shown in FIG. 5h):
Existing cell I is a parent cell to existing cell J
Existing cell J's path is identifier 1
Existing cell J's distance from start cell (existing cell A)=3
Existing cell K is a parent cell to existing cell J
Existing cell K's path is identifier 3
Existing cell K's distance from start cell (existing cell A)=3

The subset of existing cells for existing cell J are added to the open queue, if they are not already present in the open queue, existing cell J is removed from the open queue and added to the closed queue, and the open queue is ordered. The open queue now consists of existing cells H, E, K and G in that order.

Step 8

Figure 5I:
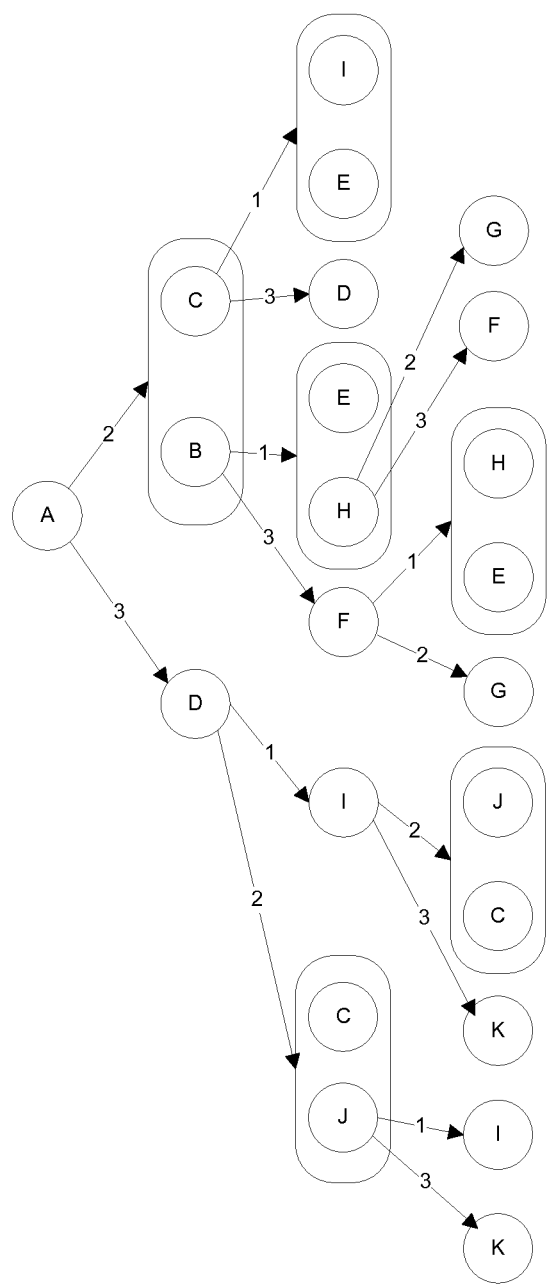

The next existing cell from the open queue (existing cell H) is now analysed. The collision information for existing cell H is calculated for each possible identifier assignment, which identifies existing cell G for identifier assignment 2 (existing cell B is not added, as it is the parent of existing cell H), and existing cell F for identifier assignment 3. Again, the process has not found a solution, as there are identifier conflicts between existing cell H and existing cells G and F. The following information is added to the graph (as shown in FIG. 5i):
Existing cell G is a parent cell to existing cell H
Existing cell G's path is identifier 2
Existing cell G's distance from start cell (existing cell A)=3
Existing cell F is a parent cell to existing cell H
Existing cell F's path is identifier 3
Existing cell F's distance from start cell (existing cell A)=3

The subset of existing cells for existing cell H are added to the open queue, if they are not already present in the open queue, existing cell H is removed from the open queue and added to the closed queue, and the open queue is ordered. The open queue now consists of existing cells E, K and G in that order.

Step 9

Figure 5J:
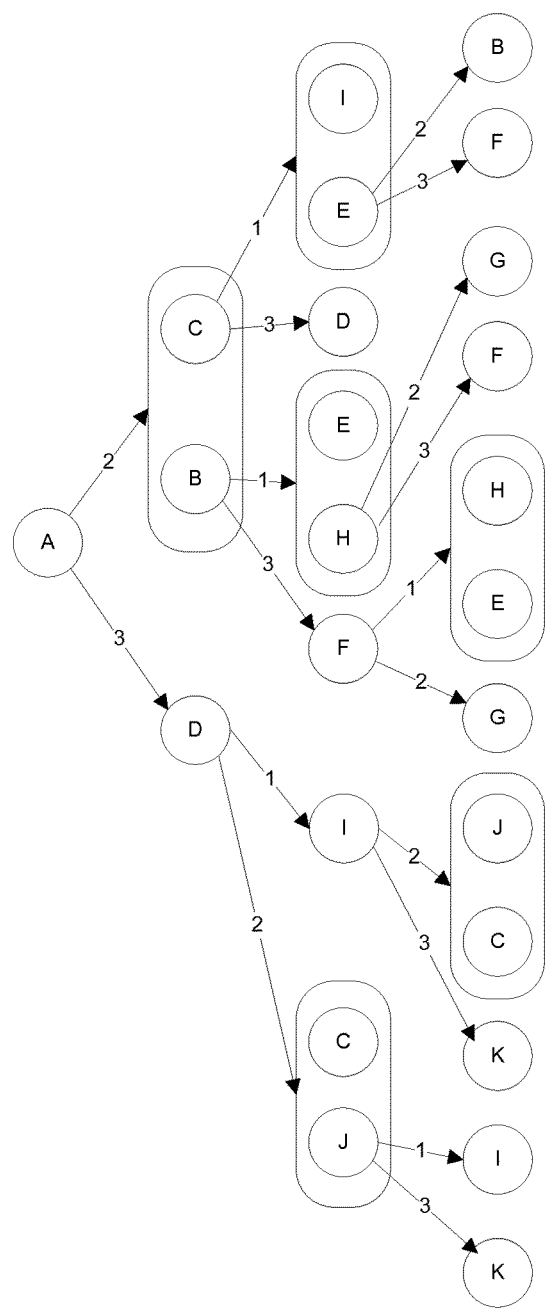

The next existing cell from the open queue (existing cell E) is now analysed. The collision information for cell E is calculated for each possible identifier assignment, which identifies existing cell B for identifier assignment 2 (existing cell C is not added, as it is the parent of existing cell E), and existing cell F for identifier assignment 3. Again, the process has not found a solution, as there are identifier conflicts between existing cell E and existing cells B and F. The following information is added to the graph (as shown in FIG. 5j):
Existing cell B is a parent cell to existing cell E
Existing cell B's path is identifier 2
Existing cell B's distance from start cell (existing cell A)=3
Existing cell F is a parent cell to existing cell E
Existing cell F's path is identifier 3
Existing cell F's distance from start cell (existing cell A)=3

The subset of existing cells for existing cell E are added to the open queue, if they are not already present in the open queue, existing cell E is removed from the open queue and added to the closed queue, and the open queue is ordered. The open queue now consists of existing cells K and G in that order.

Step 10

The next existing cell from the open queue (existing cell K) is now analysed. The collision information for cell K is calculated for each possible identifier assignment, which does not identify an identifier conflict for identifier assignment 2 (existing cell I is not added, as it is the parent of existing cell K), and identifies a collision with existing cell J for identifier assignment 3.

Figure 5K:
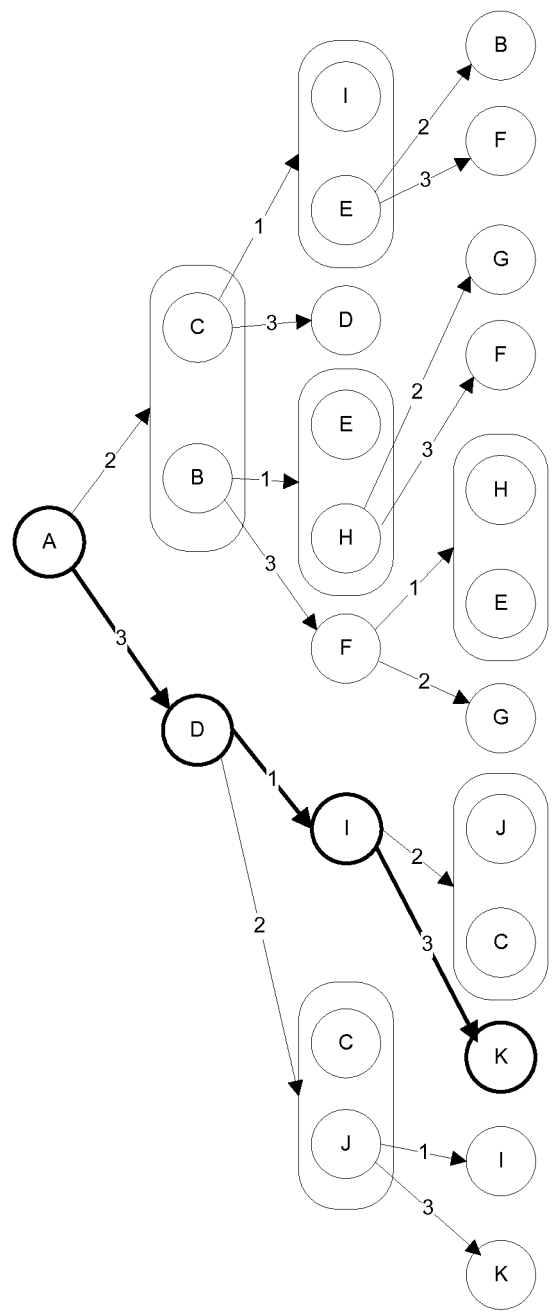
Figure 5I:
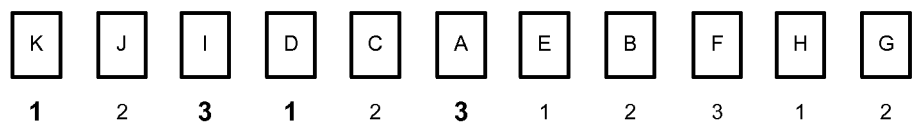

The process has therefore found a solution, as existing cell K does not have an identifier conflict for identifier assignment 2. As shown in FIG. 5k, the process has identified a path of identifier changes for several existing cells, such that cell K is assigned identifier 1 (as it has no identifier conflicts for this identifier assignment), cell I is assigned identifier 3, cell D is assigned identifier 1 and cell A is assigned identifier 3. As shown in FIG. 5l, each existing cell of the resulting network (with the above identifier changes) passes the rules (i.e. each existing cell has no identifier conflicts with its neighbour or neighbour's neighbour).

The processor 10 may therefore return a value which further includes a third part, the third part indicating the number of other existing cells that must change to another identifier of the set of identifiers in order for that existing cell to pass the rule(s). In the above detailed example, three existing cells (cell I, cell D and cell A) needed to change identifier, such that the third part of the value would be 3. The network operator may then be informed of each value for each existing cell in a table, as shown in the following example:

| Cell | Number of Possible Identifier Assignments that pass all mandatory rules | Number of Possible Identifier Assignments that pass all mandatory rules but with a cost | Number of other Existing Cells that must change identifier assignment |
|---|---|---|---|
| Cell A | 2 | 3 | — |
| Cell B | 1 | 2 | — |
| Cell C | 0 | 1 | — |
| Cell D | 0 | 0 | 3 |

The network operator is therefore informed that a new cell may be deployed near:
- Cell A—no issues (i.e. no or very low possibility of an identifier conflict);
- Cell B—small likelihood of an identifier conflict (due to the low number of possible identifier assignments that pass all mandatory rules), but identifier assignments with an acceptable cost are possible;
- Cell C—increased likelihood of an identifier conflict, identifier assignments with an acceptable cost are possible; and
- Cell D—three other existing cells would need an identifier assignment change in order for there to be no issues.

In this embodiment, the communications interface 20 is configured to send a signal to cause any one of the existing cells to change its identifier assignment. Accordingly, if the network operator determines that a new cell is to be deployed near an existing cell which currently does not pass the rule(s) for each possible identifier assignment, it may cause one or more cells on the calculated Least Impacted Path to change their identifier assignments such that the new cell may be deployed without any conflict issues.

In an enhancement, the network operator may set up threshold for different cells depending on where they are located in the telecommunications network. The threshold indicates an upper bound for the likelihood of an identifier conflict if a new cell is deployed near an existing cell in that location that the network operator determines as acceptable. The thresholds may be therefore be tailored for different locations (such as dense urban, urban, or rural), to reflect the characteristics of those locations.

The network operator may also assign colours to the different thresholds such that the data may be presented in a heat map. Furthermore, the network operator may generate events or alarms if a certain threshold is being breached.

In the above example, the telecommunications network is an LTE network. However, the skilled person will understand that the present invention is applicable to any form of telecommunications network having a plurality of cells with corresponding identifiers. Furthermore, the skilled person will understand that it is not essential for the identifier to be a physical cell identifier. Rather, the identifier may be any suitable form of identifier for a cell, such as a Scrambling Code.

In the above example, the present invention is performed on a single network element by a network operator. However, the skilled person will understand that this is not essential. That is, the processes and hardware of the present invention may be distributed about a telecommunications network.

The skilled person will also understand that the specific rules in the description above are merely exemplary, and the algorithm may use any appropriate rule or rules. The rules may be tailored to maximise the KPIs for any particular telecommunications network.

The skilled person will understand that any combination of features is possible without departing from the scope of the invention, as claimed.

The invention claimed is:

1. A method of deploying a new cell into a wireless telecommunications network, the wireless telecommunications network including a plurality of existing cells, wherein each existing cell is assigned one of a set of identifiers, the method comprising the steps of:
   identifying a plurality of existing cells in the wireless telecommunications network and a corresponding identifier for each existing cell of the plurality of existing cells;
   calculating a value for each existing cell, wherein the value represents the likelihood of an identifier conflict if a new cell is deployed near that existing cell; and
   deploying the new cell near at least any one of the plurality of existing cells from the plurality of existing cells of the wireless telecommunications network based on the calculated value for each existing cell without the identifier conflict, wherein identifier assignments of the plurality of existing cells are changed to deploy the new cell without the identifier conflict, wherein deploying the new cell comprises extending coverage of the wireless telecommunications network to a new geographic area within a predetermined distance of an existing coverage area of the wireless telecommunications network;
   wherein the value has a first and second part, wherein the first part represents a cumulative total of identifier assignments that pass a predetermined rule, and the second part represents a cumulative of total of identifier assignments that pass the predetermined rule with a cost; and wherein the step of calculating the value for the existing cell comprises determining if the existing cell passes the predetermined rule for each possible identifier assignment for the existing cell.

2. A method as claimed in claim 1, wherein the predetermined rule determines if the existing cell has the identifier conflict with another existing cell.

3. A method as claimed in claim 1, wherein the value represents a cumulative total of identifier assignments that pass the predetermined rule.

4. A method as claimed in claim 1, wherein the cost represents an increased likelihood of an identifier conflict if the new cell is deployed near that existing cell.

5. A method as claimed in claim 1, further comprising the step of:
    determining if the existing cell passes the predetermined rule for each possible identifier assignment if the existing cell changes to another identifier of the set of identifiers.

6. A method as claimed in claim 5, wherein the step of determining if the existing cell passes the predetermined rule for each possible identifier assignment if the existing cell changes to another identifier of the set of identifiers is performed for each existing cell that doesn't pass the predetermined rule for each possible identifier assignment for that existing cell.

7. A method as claimed in claim 5, wherein the step of determining if the existing cell passes the predetermined rule for each possible identifier assignment if the existing cell changes to another identifier of the set of identifiers includes the steps of:
    identifying a subset of existing cells with which the existing cell has an identifier conflict with for each possible identifier assignment for the existing cell; and
    for each existing cell of the subset of existing cells,
    determining if the existing cell of the subset of existing cells has an identifier conflict for each possible identifier assignment for the existing cell of the subset of existing cells.

8. A method as claimed in claim 7, wherein it is determined that the existing cell passes the predetermined rule for each possible identifier assignment if another existing cell changes to another identifier of the set of identifiers if it is determined that each existing cell of the subset of existing cells does not have an identifier conflict for each possible identifier assignment for the existing cell of the subset of existing cells.

9. A method as claimed in claim 7, wherein if the existing cell of the subset of existing cells has an identifier conflict with an existing cell of a new subset of existing cells, the method further comprises the steps of:
    identify each existing cell in the new subset of existing cells; and
    for each existing cell of the new subset of existing cells, determine if the existing cell of the new subset of existing cells has an identifier conflict for each possible identifier assignment for the existing cell of the new subset of existing cells.

10. A method as claimed in claim 9, wherein if the existing cell of the new subset of existing cells has an identifier conflict with an existing cell of a subsequent subset of existing cells, the steps of identifying each existing cell in the subsequent subset of existing cells and determining if each existing cell of the subsequent subset of existing cells has an identifier conflict for each possible identifier assignment are performed in an iterative manner until it is determined that an existing cell of the subsequent subset of existing cells does not have an identifier conflict for each possible identifier assignment for the existing cell of the subsequent subset of existing cells.

11. A method as claimed in claim 1, further comprising the step of:
    determining if the existing cell passes the predetermined rule for each possible identifier assignment if the existing cell changes to another identifier of the set of identifiers,
    wherein the value also has a third part, wherein the third part represents a cumulative total of other cells that change to another identifier of the set of identifiers for the existing cell to pass the predetermined rule for each possible identifier assignment.

12. A network element for deploying a new cell into a wireless telecommunications network, the network element comprising a processor and a memory, said memory containing instructions that, when executed by said processor, cause said network element to perform the steps of a method of deploying the new cell into the wireless telecommunications network, the wireless telecommunications network including a plurality of existing cells, wherein each existing cell is assigned one of a set of identifiers, the method comprising the steps of:
    identifying a plurality of existing cells in the wireless telecommunications network and a corresponding identifier for each existing cell of the plurality of existing cells;
    calculating a value for each existing cell, wherein the value represents the likelihood of an identifier conflict if a new cell is deployed near that existing cell; and
    deploying the new cell near at least any one of the plurality of existing cells from the plurality of existing cells of the wireless telecommunications network based on the calculated value for each existing cell without the identifier conflict, wherein identifier assignments of the plurality of existing cells are changed to deploy the new cell without the identifier conflict, wherein deploying the new cell comprises extending coverage of the wireless telecommunications network to a new geographic area within a predetermined distance of an existing coverage area of the wireless telecommunications network;
    wherein the value has a first and second part, wherein the first part represents a cumulative total identifier assignments that pass a predetermined rule, and the second part represents a cumulative of total of identifier assignments that pass the predetermined rule with a cost; and
    wherein the step of calculating the value for the existing cell comprises determining if the existing cell passes the predetermined rule for each possible identifier assignment for the existing cell.

13. A wireless telecommunications network having a plurality of existing cells, wherein each existing cell of the plurality of existing cells has an assigned identifier from a set of identifiers, the wireless telecommunications network comprising:
    a processor configured to calculate a value for each existing cell,
    wherein the value represents the likelihood of an identifier conflict if a new cell is deployed near that existing cell;
    wherein the processor is configured to determine if the existing cell passes a predetermined rule for each possible identifier assignment to calculate the value for the existing cell;
    wherein the processor is configured to deploy the new cell near at least any one of the plurality of existing cells from the plurality of existing cells of the wireless telecommunications network based on the calculated value for each existing cell without the identifier conflict, wherein identifier assignments of the plurality of existing cells are changed to deploy the new cell without the identifier conflict, wherein deploying the new cell comprises extending coverage of the wireless telecommunications network to a new geographic area within a predetermined distance of an existing coverage area of the wireless telecommunications network;

wherein the value has a first and second part, wherein the first part represents a cumulative total of identifier assignments that pass a predetermined rule, and the second part represents a cumulative total of identifier assignments that pass the predetermined rule with a cost; and wherein the step of calculating the value for the existing cell comprises determining if the existing cell passes the predetermined rule for each possible identifier assignment for the existing cell.

14. A wireless telecommunications network as claimed in claim 13, wherein the processor is configured to determine if the existing cell has an identifier conflict with another existing cell to determine if the existing cell passes the predetermined rule.

15. A wireless telecommunications network as claimed in claim 13, wherein the value represents a cumulative total of identifier assignments that pass the predetermined rule.

16. A wireless telecommunications network as claimed in claim 13, wherein the cost represents an increased likelihood of an identifier conflict if the new cell is deployed near the existing cell.

* * * * *